(12) United States Patent
Kim et al.

(10) Patent No.: US 9,798,419 B2
(45) Date of Patent: Oct. 24, 2017

(54) ELECTROSTATIC CAPACITIVE TYPE TOUCH SCREEN PANEL

(71) Applicant: LG Display Co., Ltd., Seoul (KR)

(72) Inventors: Seunghyun Kim, Goyang-si (KR); Jinyeol Kim, Sangju-si (KR); Sungpil Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 14/918,412

(22) Filed: Oct. 20, 2015

(65) Prior Publication Data

US 2016/0188114 A1    Jun. 30, 2016

(30) Foreign Application Priority Data

Dec. 26, 2014    (KR) .......................... 10-2014-0191142

(51) Int. Cl.
   *G06F 3/041*    (2006.01)
   *G06F 3/044*    (2006.01)

(52) U.S. Cl.
   CPC ............ *G06F 3/0418* (2013.01); *G06F 3/044* (2013.01)

(58) Field of Classification Search
   CPC ................... G06F 3/0488; G06F 3/041; G06F 2203/04103; G06F 3/0202
   See application file for complete search history.

(56) References Cited

U.S. PATENT DOCUMENTS

2012/0247812 A1* 10/2012 Yasumori ............ H01L 27/0207
                                                        174/251

* cited by examiner

*Primary Examiner* — MD Saiful A Siddiqui
(74) *Attorney, Agent, or Firm* — Fenwick & West LLP

(57) ABSTRACT

A touch-sensitive display includes a plurality of electrodes configured to detect a touch input received at the touch-sensitive display device. A plurality of touch wires formed on a substrate are electrically connected to the electrodes and configured to detect a touch input received at the touch-sensitive display device. A plurality of first conductive patterns on the substrate are each connected to a touch wire and extend in a first direction from the corresponding touch wire. An insulation layer is disposed on the plurality of touch wires and first conductive patterns, and a plurality of second conductive patterns are disposed on the insulation layer. Each second conductive pattern contacts one of the touch wires via a contact hole in the insulation layer and at least partially overlaps a corresponding one of the first conductive patterns, while being separated from the corresponding one of the first conductive patterns by the insulation layer.

18 Claims, 5 Drawing Sheets

ELECTROSTATIC CAPACITIVE TYPE TOUCH SCREEN PANEL

This application claims priority under U.S.C. §119(a) to Korean Patent Application No. 10-2014-0191142 filed on Dec. 26, 2014, which is incorporated by reference herein in its entirety.

BACKGROUND OF THE DISCLOSURE

Field of the Invention

This disclosure relates to a touch screen panel, in particular an electrostatic capacitive type touch screen panel dissipating static electricity to improve accuracy of touch perception.

Discussing of the Related Art

In recent years, display devices, such as liquid crystal display panels, electroluminescent display panels, and plasma display panels, which have a quick response speed, low power consumption, and an excellent color reproduction rate, have been in the spotlight. These display devices have been used for various electronic products such as television sets, monitors for computers, laptop computers, tablet computers, mobile phones, industrial terminals, personal digital assistants, and automated teller machines. In general, these display devices interface with various input devices such as keyboards, mouse devices, and digitizers. However, in order to use a separate input device such as a keyboard or mouse to perform a task on a machine including a display device, a user has to deal with the inconveniences of learning how to use it and the input device taking up space, thus making it difficult to complete the task. Therefore, the demand for input devices that are convenient and easy to use and reduce erroneous operation is growing more and more. In response to this demand, a touch screen panel for enabling a user to input information by touching the screen with their fingers or a pen was suggested.

The touch screen panel has a simple configuration capable of reducing erroneous operations. The user can also perform an input action without using a separate input device, and can quickly and easily manipulate a device through contents displayed on a screen. Accordingly, the touch sensor has been applied to various display devices.

In general, the touch screen panel is attached to a display device such as liquid crystal display, an electroluminescent display, or a plasma display panel, and is used as an input device generating sensing signals corresponding to contact positions when the screen of the display device is touched with conductive material such as fingers or pens.

Touch screen panels are classified into a resistive type, a capacitive type, an electromagnetic type and so on according to a detection method of a touched position. The resistive type touch screen panel detects a touched position by a voltage gradient according to resistance in a state that a DC voltage is applied to metal electrodes formed on an upper plate or a low plate. The capacitive type touch screen panel senses a touched position according to a difference in capacitance created in an upper or lower plate when the user touches an equipotential conductive film formed on the upper or lower plate. The electromagnetic type touch screen panel detects a touched position by reading an LC value induced as an electromagnetic pen touches a conductive film.

Hereinafter, a related art electrostatic capacitive type touch screen panel for a display device will be described with reference to FIGS. 1 and 2.

Figure 1:
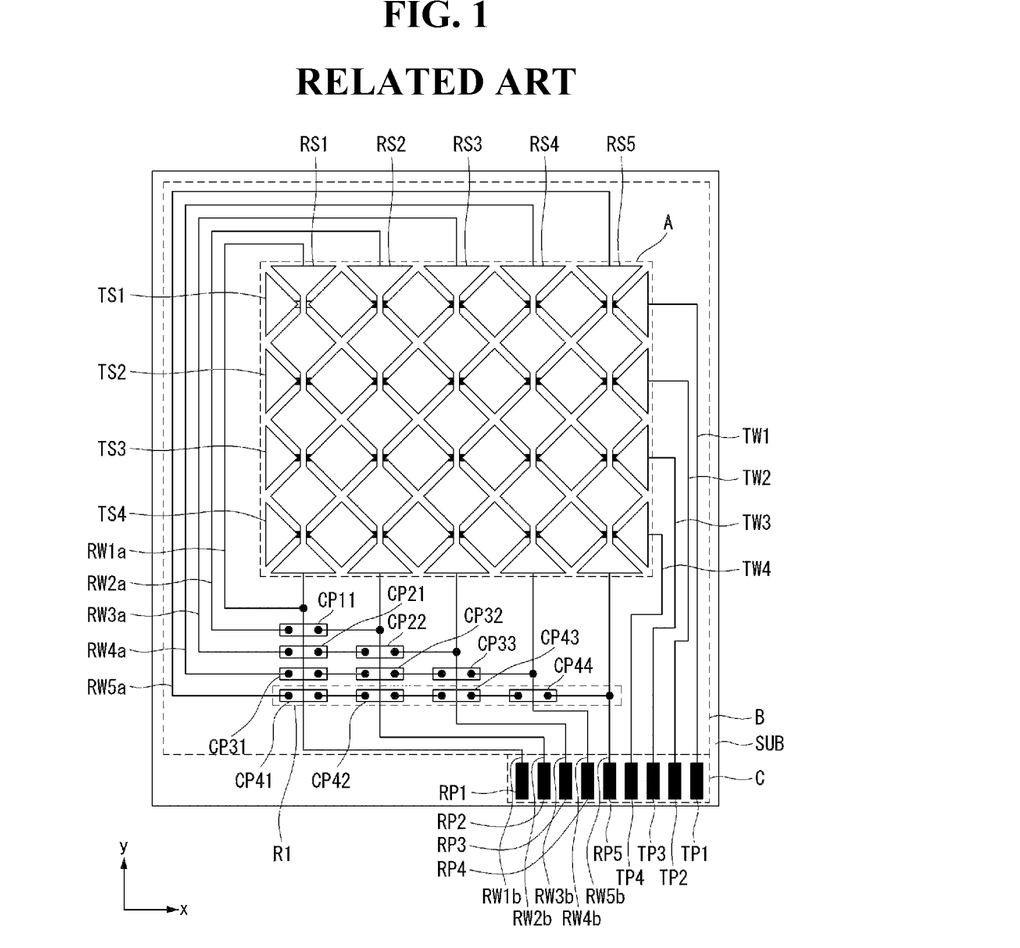
FIG. 1 is a plan view illustrating an electrostatic capacitive type touch screen panel according to a related art.
Figure 2:
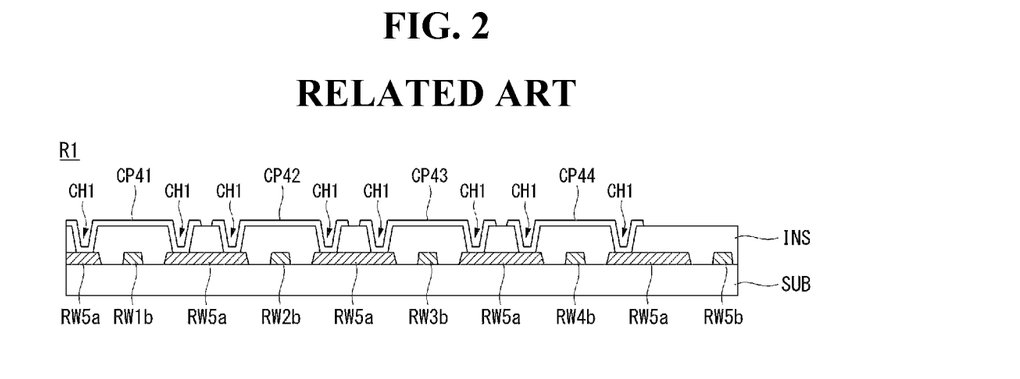
FIG. 2 is a cross-sectional view illustrating a region R1 of the touch screen panel shown in FIG. 1.

FIG. 1 is a plan view of a related art electrostatic capacitive type touch screen panel, and FIG. 2 is a cross-sectional view illustrating a region R1 of the touch screen panel shown in FIG. 1.

Referring to FIGS. 1 and 2, the related art electrostatic capacitive type touch screen panel includes an electrode part A, a routing wire part B, and a pad part C.

The electrode part A includes a plurality of first electrodes TS1 to TS4 disposed on a substrate SUB and arranged in parallel in a first direction (e.g., x-axis direction) and a plurality of second electrodes RS1 to RS5 arranged in a second direction (e.g., y-axis direction) to cross over the first electrodes TS1 to TS4.

The routing wire part B is disposed outside the electrode part A. The routing wire part B includes a plurality of first routing wires TW1 to TW4 connected to the plurality of first electrodes TS1 to TS4, respectively. Also, the routing wire part B includes a plurality of 2-1 routing wires RW1a to RW5a each connected to a first end of one of the plurality of second electrodes RS1 to RS5, and a plurality of 2-2 routing wires RW1b to RW5b each connected to a second end of one of the plurality of second electrodes RS1 to RS5.

The plurality of 2-1 routing wires RW1a to RW5a are each connected to one of the plurality of 2-2 routing wires RW1b to RW5b, which in turn are each connected to the pad part C. More specifically, the first 2-1 routing wire RW1a includes one end connected to a first end of the second electrode RS1 disposed at a first column and another end connected to the first 2-2 routing wire RW1b, which is connected to a second end of the second electrode RS1. The second 2-1 routing wire RW2a includes one end connected to a first end of the second electrode RS2 disposed at a second column and another end connected to the second 2-2 routing wire RW2b, which is connected to a second end of the second electrode RS2. In a similar manner, the third to fifth 2-1 routing wires RW3a to RW5a each have one end connected to a respective one of the third to the second electrodes RS3 to RS5 and another end connected to a respective one of the third to fifth 2-2 routing wires RW3b to RW5b.

The second 2-1 routing wire RW2a has a crossing part intersecting the first 2-2 routing wire RW1b, the third 2-1 routing wire RW3a has crossing parts intersecting the first and second 2-2 routing wires RW1b and RW2b, the fourth 2-1 routing wire RW4a has crossing parts intersecting the first, second and third 2-2 routing wires RW1b, RW2b and RW3b, and the fifth 2-1 routing wire RW5a has crossing parts intersecting the first, second, third and fourth 2-2 routing wires RW1b, RW2b, RW3b and RW4b.

An insulation layer is disposed at the crossing parts of the 2-1 routing wires RW2a to RW5a and the 2-2 routing wires RW1b to RW4b so that the 2-1 routing wires RW2a to RW5a are not in contact with the 2-2 routing wires RW1b to RW4b. As shown in FIG. 2, the 2-1 routing wires RW2a to RW5a have disconnection parts at the crossing part of the 2-1 routing wires RW2a to RW5a and the 2-2 routing wires RW1b to RW4b. The 2-1 routing wires RW2a to RW5a disconnected by the disconnection parts are exposed through contact holes CH1 to CH8 passing through the insulation layer INS. The 2-1 routing wires RW2a to RW5a separated by the disconnection parts are connected to each other by connection parts CP11, CP1 to CP22, CP31 to CP33, and CP41 to CP44 disposed on the insulation layer INS.

The pad part C includes a plurality of first pads TP1 to TP4 connected to the plurality of first routing wires TW1 to TW4 and a plurality of second pads RP1 to RP5 connected to the plurality of 2-2 routing wires RW1b to RW5b. An external integrated circuit, such as a controller for the touch panel, interfaces with the touch panel via the pad part C.

As mentioned in the related art touch screen panel having double routing wire construction, there are the crossing parts of the 2-1 routing wires RW2a to RW5a and the 2-2 routing wires RW1b to RW4b in the routing wire part B between the electrode part A and the pad part C.

In general, static electricity may be input to the touch screen panel while a user operates the touch screen panel. The static electricity may be input to the electrode part A via the first pads TP1 to TP4, the second pads RP1 to RP5, the first routing wires TW1 to TW4, the 2-2 routing wires RW1b to RW5b, and the 2-1 routing wires RW1a to RW5a because the first and second pads TP1 to TP4 and RP1 to RP5 have a large area and good conductivity.

If a touch event is performed on the touch screen panel while static electricity energy in the touch screen panel is high, a potential difference is generated at the crossing parts of the 2-1 routing wires RW1a to RW5a and the 2-2 routing wires RW1b to RW5b due to the touch event. Thus the static electricity is intensively introduced into the crossing parts where the potential difference is generated. That is, the crossing parts are weak to the static electricity. Accordingly, the crossing parts of the 2-1 routing wires RW1a to RW5a and the 2-2 routing wires RW1b to RW5b may be damaged by the high current due to the static electricity, thereby reducing accuracy of the related art touch screen panel to the touch event.

SUMMARY

According to exemplary embodiments, it is possible to prevent the touch screen panel from being damaged by the static electricity introduced from the outside during a panel fabricating process, a module fabricating process, a product transportation or a product use.

According to embodiments described herein, a touch-sensitive display is provided. The touch-sensitive display device includes a plurality of electrodes configured to detect a touch input received at the touch-sensitive display device. A plurality of touch wires formed on a substrate are electrically connected to the electrodes and configured to detect a touch input received at the touch-sensitive display device. A plurality of first conductive patterns on the substrate are each connected to a touch wire and extend in a first direction from the corresponding touch wire. An insulation layer is disposed on the plurality of touch wires and first conductive patterns, and a plurality of second conductive patterns are disposed on the insulation layer. Each second conductive pattern contacts a corresponding one of the touch wires via a contact hole in the insulation layer and at least partially overlaps a corresponding one of the first conductive patterns, while being separated from the corresponding one of the first conductive patterns by the insulation layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Hereinafter, exemplary embodiments of this disclosure will be described in detail with reference to the accompanying drawings, wherein same reference numerals may be used to denote the same or substantially the same elements throughout the specification and the drawings.

Figure 3:
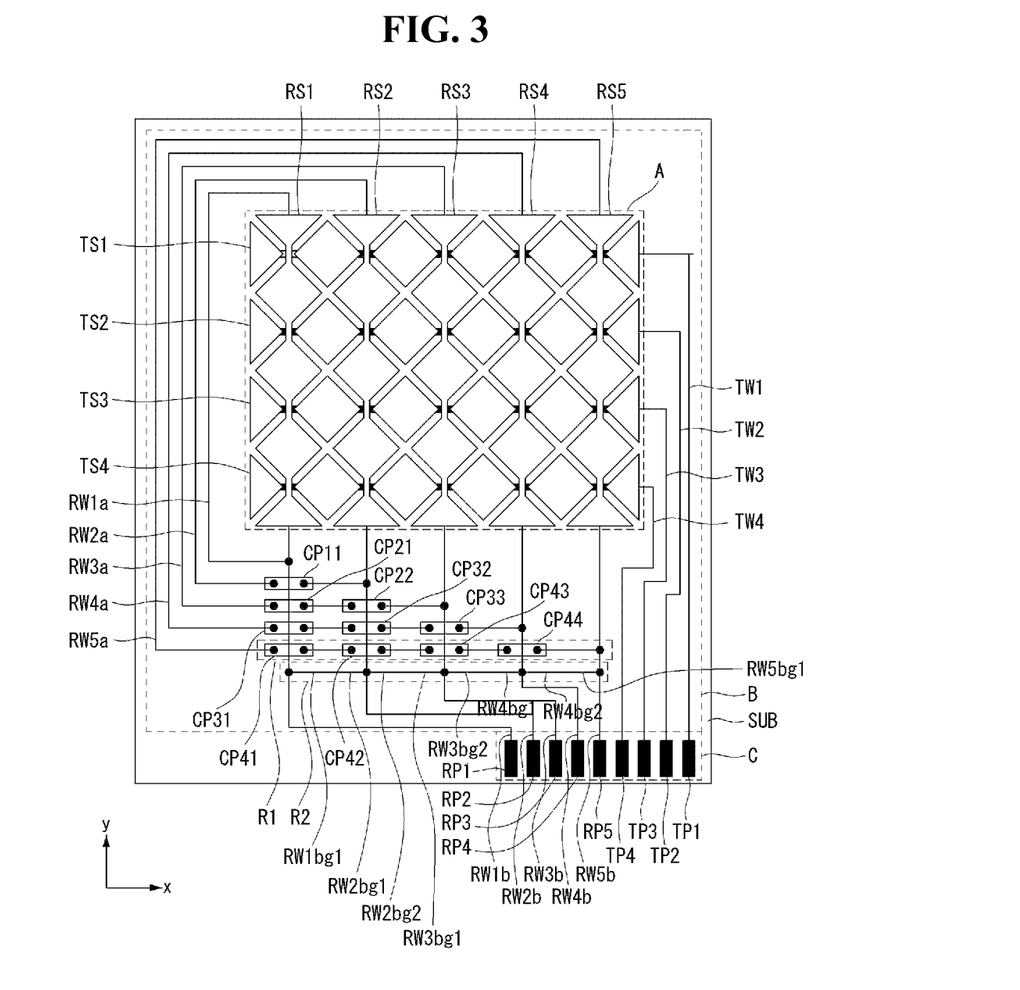
FIG. 3 is a plan view illustrating a touch screen panel according to a first embodiment.

An electrostatic capacitive type touch screen panel for a display device according to a first embodiment of the disclosure is described in detail with reference to FIGS. 3 to 5. FIG. 3 is a top planar view illustrating a touch screen panel according to a first embodiment of the disclosure, FIG. 4 is a cross-sectional view illustrating a region R1 of the touch screen panel shown in FIG. 3, and FIG. 5 is a cross-sectional view illustrating a region R2 of the touch screen panel shown in FIG. 3.

Figure 4:
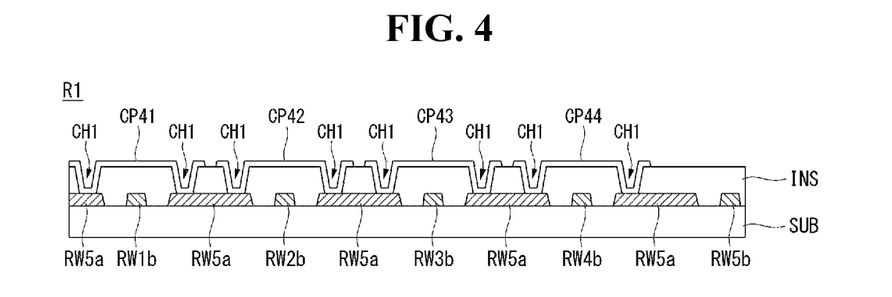
FIG. 4 is a cross-sectional view illustrating a region R1 of the touch screen panel shown in FIG. 3.
Figure 5:
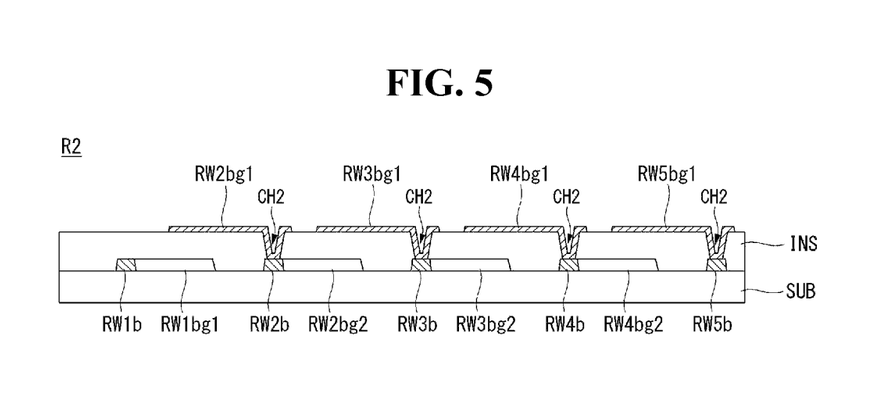
FIG. 5 is a cross-sectional view illustrating a region R2 of the touch screen panel shown in FIG. 3.

Referring to FIGS. 3 to 5, the electrostatic capacitive type touch screen panel according to a first embodiment of the disclosure includes an electrode part A, a routing wire part B disposed outside the electrode part A, and a pad part C disposed on one side of the routing wire part B.

The electrode part A includes a plurality of first electrodes TS1 to TS4 arranged in parallel in a first direction (e.g., x-axis direction) on a substrate SUB and a plurality of second electrodes RS1 to RS5 arranged in a second direction (e.g., y-axis direction). Although FIG. 3 illustrates four first electrodes TS1 to TS4 and five second electrodes RS1 to RS5, the touch screen panel may include any number of first and second electrodes. The second electrodes cross over the first electrodes TS1 to TS4, and are insulated from the first electrodes TS1 to TS4. The electrodes are configured to measure differences in capacitance between an upper plate of the touch screen panel and the substrate SUB to detect a location of a touch input received by the touch screen panel. In one embodiment, the first electrodes TS1 to TS4 receive a touch drive signal and the second electrodes RS1 to RS5 provide a touch drive signal indicative of a presence or absence of a touch input in response to the touch drive signal.

The pad part C includes a plurality of first pads TP1 to TP4 connected to the plurality of first routing wires TW1 to TW4 and a plurality of second pads RP1 to RP5 connected to the plurality of 2-2 routing wires RW1b to RW5b. An external integrated circuit, such as a controller for the touch panel, interfaces with the touch panel via the pad part C.

The routing wire part B is disposed outside the electrode part A, and includes a plurality of first routing wires TW1 to TW4. Each of the first routing wires TW1 to TW4 is connected to one of the plurality of first electrodes TS. The first routing wires TW1 to TW4 are extended to the pad part C along one side of the electrode part A.

The routing wire part B also includes a plurality of 2-1 routing wires RW1a to RW5a each connected to a first end of one of the plurality of second electrodes RS1 to RS5, and a plurality of 2-2 routing wires RW1*b* to RW5*b* each connected to a second end of the plurality of second electrodes RS1 to RS5. In one embodiment, the plurality of 2-1 routing wires RW1*a* to RW5*a* are extended to surround an upper side, a left side and a lower side of the electrode part A because plurality of 2-1 routing wires RW1*a* to RW5*a* are connected to the first ends of the plurality of second electrodes RS1 to RS5 positioned at the upper side of the electrode part A. However, the pad part C and the plurality of 2-1 routing wires RW1*a* to RW5*a* may be positioned differently with respect to the electrode part A. The plurality of 2-1 routing wires RW1*a* to RW5*a* are each connected to one of the plurality of 2-2 routing wires RW1*b* to RW5*b* that are connected to the second ends of the plurality of second electrodes RS1 to RS5, respectively.

More specifically, the first 2-1 routing wire RW1*a* includes one end connected to a first end of the second electrode RS1 disposed at a first column and another end connected to the first 2-2 routing wire RW1*b*, which in turn is connected to a second end of the second electrode RS1. The second 2-1 routing wire RW2*a* includes one end connected to a first end of the second electrode RS2 disposed at a second column and another end connected to the second 2-2 routing wire RW2*b*, which is connected to a second end of the second electrode RS2. The third 2-1 routing wire RW3*a* includes one end connected to a first end of the second electrode RS3 disposed at a third column and another end connected to the third 2-2 routing wire RW3*b*, which is connected to a second end of the second electrode RS3. The fourth 2-1 routing wire RW4*a* includes one end connected to a first end of the second electrode RS4 disposed at a fourth column and another end connected to the fourth 2-2 routing wire RW4*b*, which is connected to a second end of the second electrode RS4. The fifth 2-1 routing wire RW5*a* includes one end connected to a first end of the second electrode RS5 disposed at a fifth column and another end connected to the fifth 2-2 routing wire RW5*b*, which is connected to a second end of the second electrode RS5. The 2-1 routing wires RW1*a* and 2-2 routing wires RW1*b* may carry different voltage signals. That is, a first routing wire of the 2-1 routing wires RW1*a* and 2-2 routing wires RW1*b* may carry a different voltage signal than a second routing wire.

The second 2-1 routing wire RW2*a* has a crossing part intersecting the first 2-2 routing wire RW1*b*, the third 2-1 routing wire RW3*a* has crossing parts intersecting the first and second 2-2 routing wires RW1*b* and RW2*b*, the fourth 2-1 routing wire RW4*a* has crossing parts intersecting the first, second and third 2-2 routing wires RW1*b*, RW2*b* and RW3*b*, and the fifth 2-1 routing wire RW5*a* has crossing parts intersecting the first, second, third and fourth 2-2 routing wires RW1*b*, RW2*b*, RW3*b* and RW4*b*.

An insulation layer INS is disposed at the crossing parts of the 2-1 routing wires RW2*a* to RW5*a* and the 2-2 routing wires RW1*b* to RW4*b* so that the 2-1 routing wires RW2*a* to RW5*a* are not in contact with the 2-2 routing wires RW1*b* to RW4*b*. As shown in FIG. 4, the 2-1 routing wires RW2*a* to RW5*a* have disconnection parts at the crossing parts of the 2-1 routing wires RW2*a* to RW5*a* and the 2-2 routing wires RW1*b* to RW4*b*. Each of the 2-1 routing wires RW2*a* to RW5*a* separated by the disconnection parts are exposed through first contact holes CH1 passing through the insulation layer INS. Each of the 2-1 routing wires RW2*a* to RW5*a* separated by the disconnection parts are connected to each other by connection parts CP11, CP1 to CP22, CP31 to CP33, and CP41 to CP44 disposed on the insulation layer INS.

More specifically, segments of the second 2-1 routing wire RW2*a* that are disconnected at the crossing part of the second 2-1 routing wire RW2*a* and the first 2-2 routing wire RW1*b* are connected by the connection pattern CP11. Segments of the third 2-1 routing wire RW3*a* disconnected at the crossing parts of the third 2-1 routing wire RW3*a* and the first and second 2-2 routing wires RW1*b* and RW2*b* are connected by the connection patterns CP21 and CP22. Segments of the fourth 2-1 routing wire RW4*a* disconnected at the crossing parts of the fourth 2-1 routing wire RW4*a* and the first, second and third 2-2 routing wires RW1*b*, RW2*b* and RW3*b* are connected by the connection patterns CP31, CP32 and CP33. Segments of the fifth 2-1 routing wire RW5*a* disconnected at the crossing parts of the fifth 2-1 routing wire RW5*a* and the first, second, third and fourth 2-2 routing wires RW1*b*, RW2*b*, RW3*b* and RW4*b* are connected by the connection patterns CP41, CP42, CP43 and CP44.

The routing wire part B also includes a static electricity induction region R2. The static electricity induction region R2 is disposed between outmost crossing parts among the disconnection parts of the 2-1 routing wires RW2*a* to RW5*a* (that is, the crossing parts of the outmost 2-1 routing wires RW5*a* and the 2-2 routing wires RW1*b* to RW4*b*) and the pad part C.

The 2-2 routing wires RW1*b* and RW2*b*, RW2*b* and RW3*b*, RW3*b* and RW4*b*, RW4*b* and RW5*b* neighbored to each other include first static electricity induction patterns RW1*bg*1, RW2*bg*2, RW3*bg*2 and RW4*bg*2 and second static electricity induction patterns RW2*bg*1, RW3*bg*1, RW4*bg*1 and RW5*bg*1 in the static electricity induction region R2. Each static electricity induction pattern is formed of a conductive material, and each of the first static electricity induction patterns RW1*bg*1, RW2*bg*2, RW3*bg*2 and RW4*bg*2 at least partially overlaps a respective one of the second static electricity induction patterns RW2*bg*1, RW3*bg*1, RW4*bg*1 and RW5*bg*1.

More specifically, the first 2-2 routing wire RW1*b* includes a 1-1 static electricity induction pattern RW1*bg*1 coupled to and extending perpendicularly from the first 2-2 routing wire RW1*b* towards the second 2-2 routing wire RW2*b* adjacent to a right side of the first 2-2 routing wire RW1*b*. The 1-1 static electricity induction pattern RW1*bg*1 is formed on the substrate SUB and covered with the insulation layer INS.

The second 2-2 routing wire RW2*b* is coupled to a 2-1 static electricity induction pattern RW2*bg*1 disposed on the insulation layer INS and a 1-2 static electricity induction pattern RW2*bg*2 disposed on the substrate SUB. The 2-1 static electricity induction pattern RW2*bg*1 contacts the second 2-2 routing wire RW2*b* via a contact hole CH2 formed in the insulation layer INS, and extends perpendicularly from the second 2-2 routing wire RW2*b* toward the first 2-2 routing wire RW1*b* adjacent to the second 2-2 routing wire RW2*b* (e.g., on a left side of the second 2-2 routing wire RW2*b*). The 1-2 static electricity induction pattern RW2*bg*2 extends perpendicularly from the second 2-2 routing wire RW2*b* toward the third 2-2 routing wire RW3*b* adjacent to the second 2-2 routing wire RW2*b* (e.g., on a right side of the second 2-2 routing wire RW2*b*). The 1-2 static electricity induction pattern RW2*bg*2 is formed on the substrate SUB and covered with the insulation layer INS.

The third 2-2 routing wire RW3*b* is coupled to a 2-2 static electricity induction pattern RW3*bg*1 disposed on the insulation layer INS and a 1-3 static electricity induction pattern RW3*bg*2 disposed on the substrate SUB. The 2-2 static electricity induction pattern RW3*bg*1 contacts the third 2-2 routing wire RW3*b* via a contact hole CH2 formed in the insulation layer INS, and extends perpendicularly from the third 2-2 routing wire RW3*b* toward the second 2-2 routing wire RW2*b* adjacent to the third 2-2 routing wire RW3*b* (e.g., on a left side of the third 2-2 routing wire RW3*b*). The 1-3 static electricity induction pattern RW3*bg*2 extends perpendicularly from the third 2-2 routing wire RW3*b* toward the fourth 2-2 routing wire RW4*b* adjacent to the third 2-2 routing wire RW3*b* (e.g., on a right side of the third 2-2 routing wire RW3*b*). The 1-3 static electricity induction pattern RW3*bg*2 is formed on the substrate SUB and covered with the insulation layer INS.

The fourth 2-2 routing wire RW4*b* includes a 2-3 static electricity induction pattern RW4*bg*1 disposed on the insulation layer INS and a 1-4 static electricity induction pattern RW4*bg*2 disposed on the substrate SUB. The 2-3 static electricity induction pattern RW4*bg*1 contacts the fourth 2-2 routing wire RW4*b* via a contact hole CH2 formed in the insulation layer INS, and extends perpendicularly from the fourth 2-2 routing wire RW4*b* toward the third 2-2 routing wire RW3*b* adjacent to the fourth 2-2 routing wire RW4*b* (e.g., on a left side of the fourth 2-2 routing wire RW4*b*). The 1-4 static electricity induction pattern RW4*bg*2 extends perpendicularly from the fourth 2-2 routing wire RW4*b* to the fifth 2-2 routing wire RW5*b* adjacent to the fourth 2-2 routing wire RW4*b* (e.g., on a right side of the fourth 2-2 routing wire RW4*b*). The 1-4 static electricity induction pattern RW4*bg*2 is formed on the substrate SUB and covered with the insulation layer INS.

The fifth 2-2 routing wire RW5*b* includes a 2-4 static electricity induction pattern RW5*bg*1 disposed on the insulation layer INS. The 2-4 static electricity induction pattern RW5*bg*1 extends perpendicularly from the fifth 2-2 routing wire RW5*b* toward the fourth 2-2 routing wire RW4*b* adjacent to the fifth 2-2 routing wire RW4*b* (e.g., on a left side of the fifth 2-2 routing wire RW4*b*). The 2-4 static electricity induction pattern RW5*bg*1 is disposed on the insulation layer INS covering the 2-2 routing wires RW1*b* to RW5*b* and connected to the fifth 2-2 routing wire RW4*b* via the second contact hole CH2 passing through the insulation layer INS.

In the construction mentioned above, the first static electricity induction patterns RW1*bg*1, RW2*bg*2, RW3*bg*2 and RW4*bg*2 are disposed on the substrate SUB, and the second static electricity induction patterns RW2*bg*1, RW3*bg*1, RW4*bg*1 and RW5*bg*1 are disposed on the insulation layer INS covering the first static electricity induction patterns RW1*bg*1, RW2*bg*2, RW3*bg*2 and RW4*bg*2. Also, at least one portion of each the first static electricity induction patterns RW1*bg*1, RW2*bg*2, RW3*bg*2 and RW4*bg*2 overlaps at least one portion of each the second static electricity induction patterns RW2*bg*1, RW3*bg*1, RW4*bg*1 and RW5*bg*1, respectively.

As thus, in the touch screen panel according to the first embodiment, the first static electricity induction patterns RW1*bg*1, RW2*bg*2, RW3*bg*2 and RW4*bg*2, and the second static electricity induction patterns RW2*bg*1, RW3*bg*1, RW4*bg*1 and RW5*bg*1 connected to the 2-2 routing wires RW1*b* and RW2*b*, RW2*b* and RW3*b*, RW3*b* and RW4*b*, RW4*b* and RW5*b* neighbored to each other are at least partially overlapped with each other.

Accordingly, although a static electricity is input from the outside to the touch screen panel while a user is operating the touch screen panel, the static electricity is introduced into the first static electricity induction patterns RW1*bg*1, RW2*bg*2, RW3*bg*2 and RW4*bg*2 and the second static electricity induction patterns RW2*bg*1, RW3*bg*1, RW4*bg*1 and RW5*bg*1 in the static electricity induction region R2 but is not introduced into the crossing parts of the 2-1 routing wires RW2*a* to RW5*a* and the 2-2 routing wires RW1*b* to RW4*b*, because a potential difference is generated at the overlapping parts between the first static electricity induction patterns RW1*bg*1, RW2*bg*2, RW3*bg*2 and RW4*bg*2 and the second static electricity induction patterns RW2*bg*1, RW3*bg*1, RW4*bg*1 and RW5*bg*1. Because the static electricity is introduced the static electricity induction region R2 but is not introduced into the crossing parts of the 2-1 routing wires RW2*a* to RW5*a* and the 2-2 routing wires RW1*b* to RW4*b*, it is possible to protect the routing wires from the static electricity and thereby reduce faulty touch perception that results from damage of the routing wires. Specifically, the overlapping parts between the first static electricity induction patterns RW1*bg*1, RW2*bg*2, RW3*bg*2 and RW4*bg*2 and the second static electricity induction patterns RW2*bg*1, RW3*bg*1, RW4*bg*1 and RW5*bg*1 have a large area relative to cross-sectional areas of the routing wires. As a result of the large area of the overlapping regions, each overlapping region has a high capacitance and can therefore store a large charge. Charge introduced to the 2-1 routing wires RW2*a* to RW5*a* and the 2-2 routing wires RW1*b* to RW4*b* is therefore stored by the overlapping regions of the first static electricity induction patterns RW1*bg*1, RW2*bg*2, RW3*bg*2 and RW4*bg*2 and the second static electricity induction patterns RW2*bg*1, RW3*bg*1, RW4*bg*1 and RW5*bg*1

Figure 6:
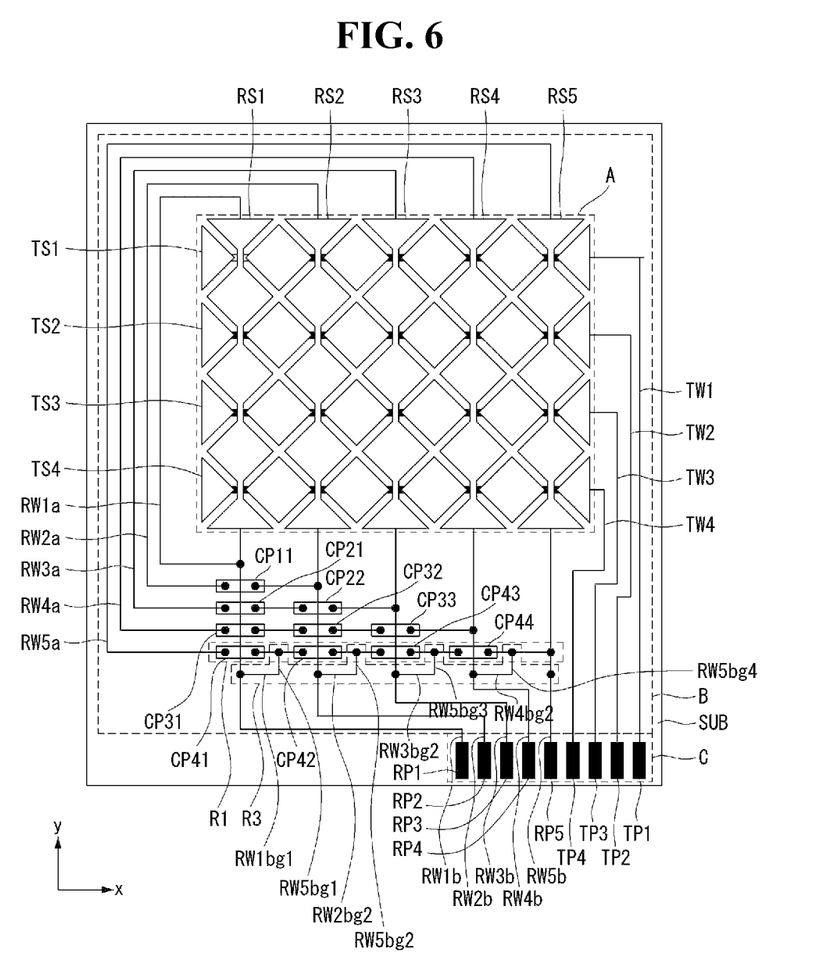
FIG. 6 is a plan view illustrating a touch screen panel according to a second embodiment.

Next, an electrostatic capacitive type touch screen panel for a display device according to a second embodiment of the disclosure is described in detail with reference to FIGS. 6 to 8. FIG. 6 is a top planar view illustrating a touch screen panel according to a second embodiment, FIG. 7 is a cross-sectional view illustrating a region R1 of the touch screen panel shown in FIG. 6, and FIG. 8 is a cross-sectional view illustrating a region R3 of the touch screen panel shown in FIG. 6.

Figure 7:
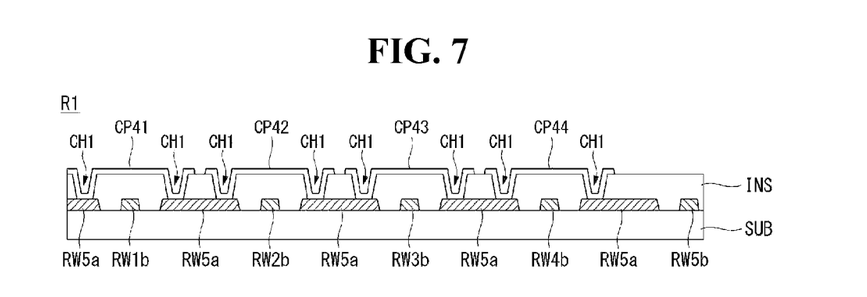
FIG. 7 is a cross-sectional view illustrating a region R1 of the touch screen panel shown in FIG. 6.
Figure 8:
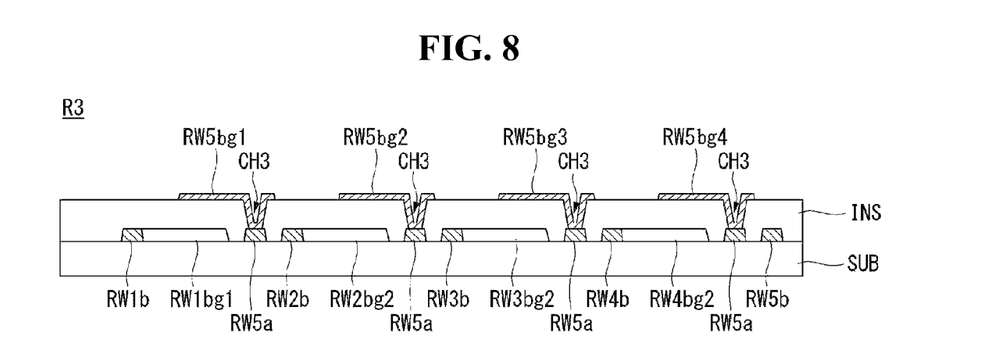
FIG. 8 is a cross-sectional view illustrating a region R3 of the touch screen panel shown in FIG. 6.

Referring to FIGS. 6 to 8, the electrostatic capacitive type touch screen panel according to the second embodiment includes an electrode part A, a routing wire part B disposed outside the electrode part A, and a pad part C disposed on one side of the routing wire part B similar to the electrostatic capacitive type touch screen panel according to the first embodiment.

The electrostatic capacitive type touch screen panel according to the second embodiment is substantially similar to the electrostatic capacitive type touch screen panel according to the first embodiment except that a third region R3 (static electricity induction region) of the electrostatic capacitive type touch screen panel according to the second embodiment is different from the second region R2 (static electricity induction region) of the electrostatic capacitive type touch screen panel according to the first embodiment. Therefore, the electrostatic capacitive type touch screen panel according to the second embodiment will be described mainly with the third region R3 (hereinafter, referred to as "the static electricity induction region R3") in order to obviate repeated description.

The static electricity induction region R3 is disposed between outmost crossing parts among the disconnection parts of the 2-1 routing wires RW2*a* to RW5*a* (that is the crossing parts of the outmost 2-1 routing wires RW5*a* and the 2-2 routing wires RW1*b* to RW4*b*) and the pad part C.

The static electricity induction region R3 includes a plurality of first static electricity induction patterns RW1*bg*1, RW2*bg*2, RW3*bg*2 and RW4*bg*2 and second static electricity induction patterns RW5*bg*1, RW5*bg*2, RW5*bg*3 and RW5bg4, each of which is formed of a conductive material. The first static electricity induction patterns RW1bg1, RW2bg2, RW3bg2 and RW4bg2 are coupled to and extend perpendicularly from the 2-2 routing wires RW1b to RW5b, respectively. The second static electricity induction patterns RW5bg1, RW5bg2, RW5bg3 and RW5bg5 are respectively extended from the fifth 2-1 routing wire RW5a disposed between the 2-2 routing wires RW1b and RW2b, RW2b and RW3b, RW3b and RW4b, and RW4b and RW5b neighbored to each other. Each the first static electricity induction patterns RW1bg1, RW2bg2, RW3bg2 and RW4bg2 overlaps at least one portion of each the second static electricity induction patterns RW5bg1, RW5bg2, RW5bg3 and RW5bg5 with an insulation layer INS disposed therebetween.

More specifically, the first 2-2 routing wire RW1b includes a 1-1 static electricity induction pattern RW1bg1 coupled to and extending perpendicularly from the first 2-2 routing wire RW1b toward the second 2-2 routing wire RW2b adjacent to the first 2-2 routing wire RW1b (e.g., on a right side of the first 2-2 routing wire). The 1-1 static electricity induction pattern RW1bg1 is coupled to and extends perpendicularly from the first 2-2 routing wire RW1b on the substrate SUB and is covered with the insulation layer INS. The fifth 2-1 routing wire RW5a between the first 2-2 routing wire RW1b and the second 2-2 RW2b routing wire is connected to the 2-1 static electricity induction pattern RW5bg1 disposed on the insulation layer INS via a third contact hole CH3 passing through the insulation layer INS. The 1-1 static electricity induction pattern RW1bg1 overlaps at least one portion of the 2-1 static electricity induction patterns RW5bg1 with the insulation layer INS therebetween.

The second 2-2 routing wire RW2b is coupled to a 1-2 static electricity induction pattern RW2bg2 extended from the second 2-2 routing wire RW2b toward the third 2-2 routing wire RW3b adjacent to the second 2-2 routing wire RW2b (e.g., on a right side of the second 2-2 routing wire RW2b). The 1-2 static electricity induction pattern RW2bg2 is extended from the second 2-2 routing wire RW2b on the substrate SUB and covered with the insulation layer INS. The fifth 2-1 routing wire RW5a between the second 2-2 routing wire RW2b and the third 2-2 RW3b routing wire is connected to the 2-2 static electricity induction pattern RW5bg2 disposed on the insulation layer INS via a third contact hole CH3 passing through the insulation layer INS. The 1-2 static electricity induction pattern RW2bg2 overlaps at least one portion of the 2-2 static electricity induction patterns RW5bg2 with the insulation layer INS therebetween.

The third 2-2 routing wire RW3b is coupled to a 1-3 static electricity induction pattern RW3bg2 extended from the third 2-2 routing wire RW3b toward the fourth 2-2 routing wire RW4b adjacent to the third 2-2 routing wire RW3b (e.g., on a right side of the third 2-2 routing wire RW3b). The 1-3 static electricity induction pattern RW3bg2 is extended from the third 2-2 routing wire RW3b on the substrate SUB and covered with the insulation layer INS. The fifth 2-1 routing wire RW5a between the third 2-2 routing wire RW3b and the fourth 2-2 RW4b routing wire is connected to the 2-3 static electricity induction pattern RW5bg3 disposed on the insulation layer INS via a third contact hole CH3 passing through the insulation layer INS. The 1-3 static electricity induction pattern RW3bg2 overlaps at least one portion of the 2-3 static electricity induction patterns RW5bg3 with the insulation layer INS therebetween.

The fourth 2-2 routing wire RW4b is coupled to a 1-4 static electricity induction pattern RW4bg2 extended from the fourth 2-2 routing wire RW4b toward the fifth 2-2 routing wire RW5b adjacent to the fourth 2-2 routing wire RW4b (e.g., on a right side of the fourth 2-2 routing wire RW4b). The 1-4 static electricity induction pattern RW4bg2 is extended from the fourth 2-2 routing wire RW4b on the substrate SUB and covered with the insulation layer INS. The fifth 2-1 routing wire RW5a between the fourth 2-2 routing wire RW4b and the fifth 2-2 RW5b routing wire is connected to the 2-4 static electricity induction pattern RW5bg4 disposed on the insulation layer INS via a third contact hole CH3 passing through the insulation layer INS. The 1-4 static electricity induction pattern RW4bg2 overlaps at least one portion of the 2-4 static electricity induction patterns RW5bg4 with the insulation layer INS therebetween.

In the construction mentioned above, each the 1-1 to 1-4 static electricity induction patterns RW1bg1, RW2bg2, RW3bg2 and RW4bg2 is disposed on the substrate SUB to overlap at least one portion of each the 2-1 to 2-4 static electricity induction patterns RW5bg1, RW5bg2, RW5bg3 and RW5bg4 disposed on the insulation layer INS. Also, each of the 1-1 to 1-4 static electricity induction patterns RW1bg1, RW2bg2, RW3bg2 and RW4bg2 is connected to a respective one of the 2-2 routing wires RW1b, RW2b, RW3b and RW4b.

Accordingly, although a static electricity is input from the outside to the touch screen panel while a user is operating the touch screen panel, the static electricity is introduced into the first static electricity induction patterns RW1bg1, RW2bg2, RW3bg2 and RW4bg2 and the second static electricity induction patterns RW5bg1, RW5bg2, RW5bg3 and RW5bg4 in the static electricity induction region R3 but is not introduced into the crossing parts of the 2-1 routing wires RW2a to RW5a and the 2-2 routing wires RW1b to RW4b because a potential difference is generated at the overlapping parts between the first static electricity induction patterns RW1bg1, RW2bg2, RW3bg2 and RW4bg2 and the second static electricity induction patterns RW5bg1, RW5bg2, RW5bg3 and RW5bg4. Because the static electricity is introduced the static electricity induction region R2 but is not introduced into the crossing parts of the 2-1 routing wires RW2a to RW5a and the 2-2 routing wires RW1b to RW4b, it is possible to protect the routing wires from the static electricity and thereby reduce faulty touch perception due to damage of the routing wires.

The touch screen panels according to the first and second embodiments of this disclosure may be applied to the display devices such as liquid crystal displays (LCD), field emission displays (FED), plasma display panels (PDP), electroluminescence (EL) devices, and electrophoresis displays. In these cases, the substrate of the touch screen panel according to the exemplary embodiments can be used as the substrate of the display device.

Although exemplary embodiments have been illustrated and described, it will be apparent to those skilled in the art that various changes and modifications can be made without departing from the spirit of this disclosure.

For example, it is described that the first routing wires TW1 to TW4 are connected to one ends of the first electrodes TS1 to TS4, respectively in the exemplary embodiments. However, the disclosures are not limited to that set forth herein. 1-1 routing wires) of first routing wires are connected to first ends of the first electrodes, respectively, and 1-2 routing wires are connected to second ends of the first electrodes TS1 to TS4, respectively. In this case, the 1-1 routing wires are connected to the 1-2 routing wires, respectively. Otherwise the 1-2 routing wires may be connected to the 1-1 routing wires, respectively. Also, the 1-1 routing wires are connected to the first pads, respectively, or the 1-2 routing wires are connected to the first pads, respectively. According to the modification mentioned above, the 1-1 routing wires or 1-2 routing wires having crossing parts may include static electricity induction patterns similar to the 2-2 routing wires according to the exemplary embodiments.

Also, it should be understood that number of the electrodes, routing wires, pads is exemplary and explanatory, and are not intended to limit the scope of the invention.

Thus, it is intended that embodiments described herein cover the modifications and variations of this invention provided they come within the scope of the appended claims and their equivalents.

What is claimed is:

1. A touch-sensitive display device, comprising:
   a plurality of electrodes configured to detect a touch input received at the touch-sensitive display device;
   a plurality of touch wires on a substrate, the touch wires electrically connected to the electrodes and configured to detect a touch input received at the touch-sensitive display device;
   a plurality of first conductive patterns disposed directly on the substrate, each first conductive pattern connected to a touch wire and extending in a first direction from the corresponding touch wire;
   an insulation layer disposed on the plurality of touch wires and first conductive patterns; and
   a plurality of second conductive patterns disposed on the insulation layer, each second conductive pattern contacting a corresponding one of the touch wires via a contact hole in the insulation layer and at least partially overlapping a corresponding one of the first conductive patterns while being separated from the corresponding one of the first conductive patterns by the insulation layer.

2. The touch-sensitive display device of claim 1, wherein a second conductive pattern contacts a first touch wire and at least partially overlaps a first conductive pattern coupled to a second touch wire adjacent to the first touch wire.

3. The touch-sensitive display device of claim 1, further comprising:
   a plurality of contact pads configured to receive input from or provide output to a controller of the touch-sensitive display device, the touch wires coupling the electrodes to the contact pads;
   wherein the first and second conductive patterns are disposed between the contact pads and the electrodes.

4. A touch-sensitive display device, comprising:
   a plurality of electrodes configured to detect a touch input received at the touch-sensitive display device;
   a plurality of touch wires on a substrate, the touch wires electrically connected to the electrodes and configured to detect a touch input received at the touch-sensitive display device;
   a plurality of contact pads configured to receive input from or provide output to a controller of the touch-sensitive display device, the touch wires coupling the electrodes to the contact pads, wherein a first subset of the touch wires couple first ends of the electrodes to the contact pads and a second subset of the touch wires couple second ends of the electrodes to the contact pads, wherein the first subset of the touch wires cross the second subset of the touch wires;
   a plurality of connection patterns coupled to each touch wire in the first subset, the connection patterns disposed on the insulation layer and connecting segments of a respective touch wire to cross one or more of the touch wires in the second subset;
   a plurality of first conductive patterns on the substrate, each first conductive pattern connected to a touch wire and extending in a first direction from the corresponding touch wire;
   an insulation layer disposed on the plurality of touch wires and first conductive patterns; and
   a plurality of second conductive patterns disposed on the insulation layer, each second conductive pattern contacting a corresponding one of the touch wires via a contact hole in the insulation layer and at least partially overlapping a corresponding one of the first conductive patterns while being separated from the corresponding one of the first conductive patterns by the insulation layer, wherein the first and second conductive patterns are disposed between the contact pads and the electrodes.

5. The touch-sensitive display device of claim 4, wherein the first and second conductive patterns are disposed between the contact pads and the connection patterns.

6. The touch-sensitive display device of claim 4, wherein at least one of the second conductive patterns contacts a corresponding one of the touch wires in the second subset and at least partially overlaps a first conductive pattern coupled to another corresponding one of the touch wires in the second subset.

7. The touch-sensitive display device of claim 4, wherein at least one of the second conductive patterns contacts a touch wire in the first subset and partially overlaps a first conductive pattern coupled to a touch wire in the second subset.

8. The touch-sensitive display device of claim 4, wherein at least one of the plurality of connection patterns contacts segments of a touch wire in the first subset on opposite sides of a touch wire in the second subset via contact holes in the insulation layer.

9. The touch-sensitive display device of claim 4, wherein the plurality of electrodes comprise a plurality of first electrodes to receive a touch drive signal and a plurality of second electrodes to provide a touch sense signal indicative of a presence or absence of the touch input in response to the touch drive signal, wherein the touch wires in the first subset are coupled to first ends of the second electrodes and the touch wires in the second subset are coupled to second ends of the second electrodes.

10. A touch-sensitive display device, comprising:
    a plurality of electrodes configured to detect a touch input received at the touch-sensitive display device;
    a plurality of touch wires on a substrate, the touch wires electrically connected to the electrodes and configured to detect a touch input received at the touch-sensitive display device;
    a plurality of first conductive patterns disposed on the substrate in a same layer as the touch wires, each first conductive pattern connected to a touch wire and extending in a first direction from the corresponding touch wire;
    an insulation layer disposed on the plurality of touch wires and first conductive patterns; and
    a plurality of second conductive patterns disposed on the insulation layer, each second conductive pattern contacting a corresponding one of the touch wires via a contact hole in the insulation layer and at least partially overlapping a corresponding one of the first conductive patterns while being separated from the corresponding one of the first conductive patterns by the insulation layer.

11. The touch-sensitive display device of claim 10, wherein a second conductive pattern contacts a first touch wire and at least partially overlaps a first conductive pattern coupled to a second touch wire adjacent to the first touch wire.

12. The touch-sensitive display device of claim 10, further comprising:
 a plurality of contact pads configured to receive input from or provide output to a controller of the touch-sensitive display device, the touch wires coupling the electrodes to the contact pads;
 wherein the first and second conductive patterns are disposed between the contact pads and the electrodes.

13. The touch-sensitive display device of claim 12, wherein a first subset of the touch wires couple first ends of the electrodes to the contact pads and a second subset of the touch wires couple second ends of the electrodes to the contact pads, wherein the first subset of the touch wires cross the second subset of the touch wires, the touch-sensitive display device further comprising:
 a plurality of connection patterns coupled to each touch wire in the first subset, the connection patterns disposed on the insulation layer and connecting segments of a respective touch wire to cross one or more of the touch wires in the second subset.

14. The touch-sensitive display device of claim 13, wherein the first and second conductive patterns are disposed between the contact pads and the connection patterns.

15. The touch-sensitive display device of claim 13, wherein at least one of the second conductive patterns contacts a corresponding one of the touch wires in the second subset and at least partially overlaps a first conductive pattern coupled to another corresponding one of the touch wires in the second subset.

16. The touch-sensitive display device of claim 13, wherein at least one of the second conductive patterns contacts a touch wire in the first subset and partially overlaps a first conductive pattern coupled to a touch wire in the second subset.

17. The touch-sensitive display device of claim 13, wherein at least one of the plurality of connection patterns contacts segments of a touch wire in the first subset on opposite sides of a touch wire in the second subset via contact holes in the insulation layer.

18. The touch-sensitive display device of claim 13, wherein the plurality of electrodes comprise a plurality of first electrodes to receive a touch drive signal and a plurality of second electrodes to provide a touch sense signal indicative of a presence or absence of the touch input in response to the touch drive signal, wherein the touch wires in the first subset are coupled to first ends of the second electrodes and the touch wires in the second subset are coupled to second ends of the second electrodes.

* * * * *